United States Patent [19]
Kim et al.

[11] Patent Number: 5,521,927
[45] Date of Patent: May 28, 1996

[54] ELEMENTARY STREAM PACKETIZING UNIT FOR MPEG-2 SYSTEM

[75] Inventors: Do N. Kim; Chi T. Ahn; Yo S. Ho, all of Seoul, Rep. of Korea

[73] Assignee: Electronics and Telecommunications Research Institute, Daejeon, Rep. of Korea

[21] Appl. No.: 404,603

[22] Filed: Mar. 15, 1995

[30] Foreign Application Priority Data

Dec. 13, 1994 [KR] Rep. of Korea ................. 94-34004

[51] Int. Cl.$^6$ ..................................................... H04N 7/50
[52] U.S. Cl. ...................... 370/94.2; 370/99; 370/100.1; 370/112; 370/118; 348/423
[58] Field of Search ........................ 370/60, 60.1, 94.1, 370/94.2, 99, 100.1, 112, 118; 348/423

[56] References Cited

U.S. PATENT DOCUMENTS

| | | | |
|---|---|---|---|
| 5,231,492 | 7/1993 | Dangi et al. | 348/423 X |
| 5,262,964 | 11/1993 | Bonsall et al. | 370/94.2 X |
| 5,287,182 | 2/1994 | Haskell et al. | 348/484 X |
| 5,381,181 | 1/1995 | Deiss | 348/423 |
| 5,396,497 | 3/1995 | Veltman | 370/100.1 |

Primary Examiner—Douglas W. Olms
Assistant Examiner—Russell W. Blum
Attorney, Agent, or Firm—Keck, Mahin & Cate

[57] ABSTRACT

An elementary stream packetizing unit for an MPEG-2 system comprising a system time clock generator for sampling an external system clock signal at a resolution of a predetermined frequency, first and second time stamp generators for latching a sampled value from the system time clock generator to generate a first presentation time stamp and a decoding time stamp for the process of video elementary stream data and a second presentation time stamp for the process of audio elementary stream data, respectively, first and second stream interface circuits for inputting the video and audio elementary stream data and generating a group-of-picture detect signal and an audio frame synchronous word detection start signal, respectively, first and second buffers for storing the video and audio elementary stream data and generating first and second header generation start signals, respectively, first and second header generators for generating first and second headers, respectively, a first multiplexer for multiplexing the first header from the first header generator and the video elementary stream data to generate a packetized video elementary stream, and a second multiplexer for multiplexing the second header from the second header generator and the audio elementary stream data to generate a packetized audio elementary stream.

5 Claims, 5 Drawing Sheets

ELEMENTARY STREAM PACKETIZING UNIT FOR MPEG-2 SYSTEM

BACKGROUND OF THE INVENTION

1. Field of the Invention

The present invention relates to an elementary stream packetizing unit for an MPEG-2 system.

2. Description of the Prior Art

An ISO (international standard organization)/IEC (international electronic commission) MPEG-2 system will be employed as an international standard. An encoder must be developed for meeting such an MPEG-2 system and for the use in a digital television (TV) broadcasting through a satellite or cable television network.

One example of MPEG-2 standard is illustrated in ISO/IEC JTC1/SC29/WG11 13818-1 Draft International Standard, Generic Coding of Moving Pictures and Associated Audio: ISO/IEC 13818-1 MPEG-2 System, November 1994. Further, MPEG-2 standard is defined as follows.

A frame consists of three rectangular matrices of integers; a luminance matrix (Y), and two chrominance matrices (Cb and Cr). A field consists of every other line of samples in the three rectangular matrices of integers representing a frame. A frame is the union of a top field and a bottom field. The top field is the field that contains the top-most line of each of the three matrices. The bottom field is the field that contains the bottom-most line of each of the three matrices.

The picture is either a frame or one field of a frame. There are three types of pictures that use different coding methods. An intra-coded picture (I picture) is coded using information only from itself. A predictive-coded picture (P picture) is a picture which is coded using motion compensated prediction from a past I picture or P picture. A bidirectionally predictive-coded picture (B picture) is a picture which is coded using motion compensated prediction from a past and/or future I picture or P picture.

The MPEG-2 system specifies a protocol for multiplexing compressed video and audio bit streams and auxiliary data. particularly, the MPEG-2 system recommends that a transport stream manner be employed in applications in which occurrence of an error in transmission is anticipated.

The transport stream manner comprises two stream layers, a packetized elementary stream (referred to hereinafter as PES) layer for packetization of the video or audio stream and a transport stream (referred to hereinafter as TS) layer for partitioning the PES in the unit of a constant size and appending a header to each partitioned stream portion to make connections to an asynchronous transfer mode (referred to hereinafter as ATM) network easy.

Each off the coded video and audio streams is packetized in the PES layer and the resultant packets are multiplexed into a single TS in the TS layer together with information necessary to demultiplexing.

SUMMARY OF THE INVENTION

It is an object of the present invention to provide an elementary stream packetizing unit for an MPEG-2 system which is capable of receiving coded video and audio streams and packetizing the received streams, respectively.

In accordance with the present invention, the above and other objects can be accomplished by a provision of an elementary stream packetizing unit for an MPEG-2 system comprising system time clock generation means for inputting an external system clock signal and sampling the inputted system clock signal at a resolution of a predetermined frequency; first time stamp generation means for latching a sampled value from the system time clock generation means in response to an external clock signal indicating the start of an I picture, to generate a first presentation time stamp and a decoding time stamp for the process of video elementary stream data; second time stamp generation means for latching the sampled value from the system time clock generation means in response to an audio frame synchronous word detection start signal to generate a second presentation time stamp for the process of audio elementary stream data; first stream interface means for inputting the video elementary stream data from the outside and generating a group-of-picture detect signal in response to the inputted video elementary stream data, the first stream interface means outputting the inputted video elementary stream data directly; second stream interface means for inputting the audio elementary stream data from the outside and generating the audio frame synchronous word detection start signal in response to the inputted audio elementary stream data, the second stream interface means outputting the inputted audio elementary stream data directly and transferring the audio frame synchronous word detection start signal to the second time stamp generation means; first buffering means for storing temporarily the video elementary stream data from the first stream interface means and generating a first header generation start signal, in response to the group-of-picture detect signal from the first stream interface means; second buffering means for storing temporarily the audio elementary stream data from the second stream interface means and generating a second header generation start signal, in response to the audio frame synchronous word detection start signal from the second stream interface means; first header generation means for generating a first header in response to the first presentation time stamp and the decoding time stamp from the first time stamp generation means, the first header generation start signal from the first buffering means and the group-of-picture detect signal from the first stream interface means; second header generation means for generating a second header in response to the second presentation time stamp from the second time stamp generation means, the second header generation start signal from the second buffering means and the audio frame synchronous word detection start signal from the second stream interface means; first multiplexing means for multiplexing the first header from the first header generation means and the video elementary stream data from the first buffering means in response to the first header generation start signal from the first buffering means to generate a packetized video elementary stream; and second multiplexing means for multiplexing the second header from the second header generation means and the audio elementary stream data from the second buffering means in response to the second header generation start signal from the second buffering means to generate a packetized audio elementary stream.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
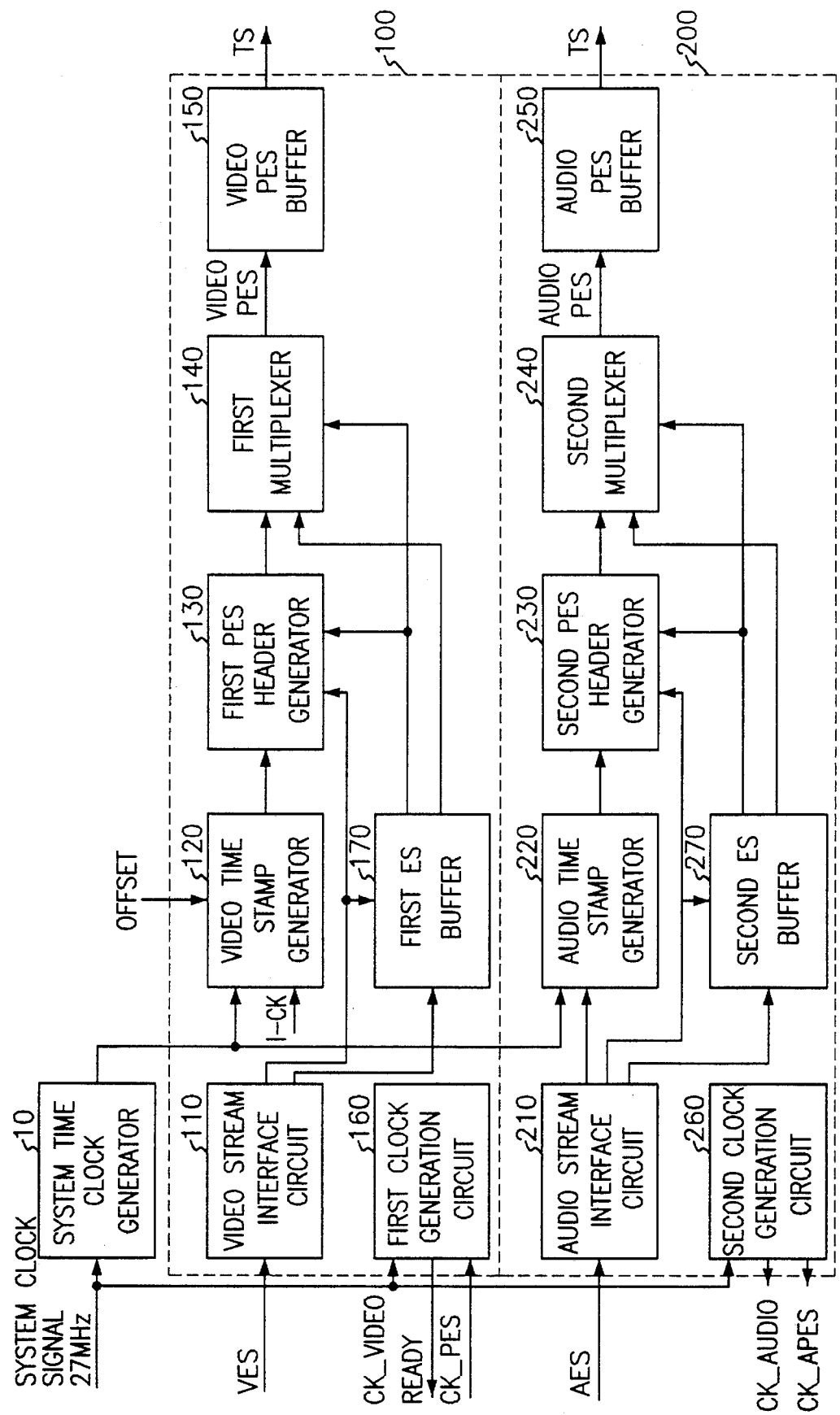
FIG. 1 is a block diagram of an elementary stream packetizing unit for an MPEG-2 system in accordance with the present invention.
Figure 2:
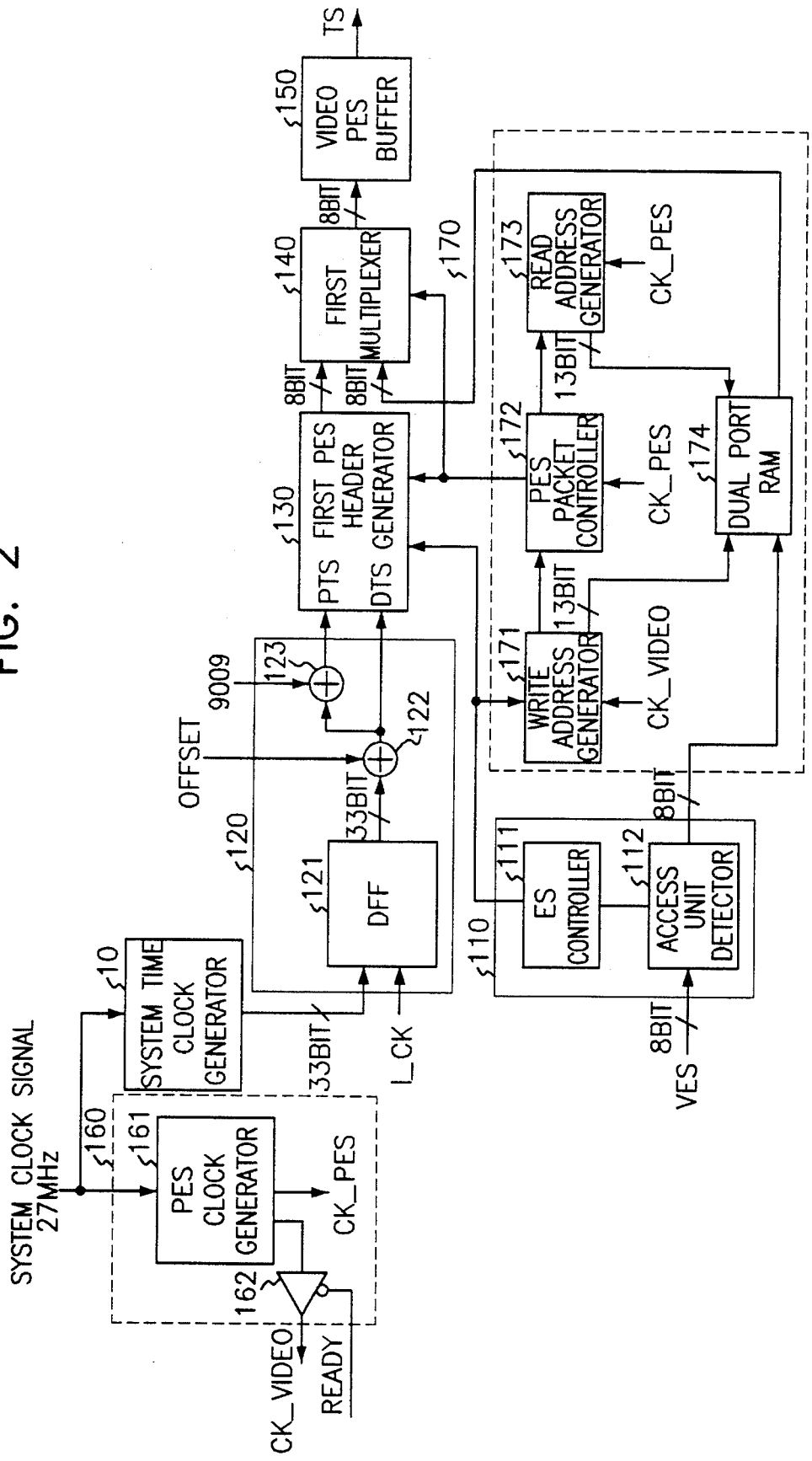
FIG. 2 is a detailed block diagram of a video PES processing circuit in FIG. 1.

FIG. 1 is a block diagram of an elementary stream (referred to hereinafter as ES) packetizing unit for an MPEG-2 system in accordance with the present invention and FIG. 2 is a detailed block diagram of a video PES processing circuit 100 in FIG. 1. As shown in these drawings, the ES packetizing unit comprises a first clock generation circuit 160 including a PES clock generator 161. The PES clock generator 161 generates clock signals CK_VIDEO and CK_PES in response to an external system clock signal of 27 MHz, the generated clock signals CK_VIDEO and CK_PES being used in the video PES processing circuit 100.

The ES packetizing unit further comprises a video stream interface circuit 110 including an ES controller 111 and an access unit detector 112. The access unit detector 112 inputs 8-bit video elementary stream data VES from a buffer of a video encoder, not shown, and generates a video detect signal in response to the inputted video elementary stream data. The generated video detect signal from the access unit detector 112 is supplied to the ES controller 111. The 8-bit video stream data is also stored into a dual port random access memory (referred to hereinafter as RAM) 174 in a first ES buffer 170.

The ES controller 111 generates a group-of-picture (GOP) detect signal in response to the video detect signal from the access unit detector 112 and outputs the detected GOP detect signal to a first PES header generator 130 and a write address generator 171 in the first ES buffer 170. The write address generator 171 generates a write start signal and a 13-bit write address in response to the clock signal CK_VIDEO from the PES clock generator 161 and the GOP detect signal from the ES controller 111. The generated write start signal from the write address generator 171 is applied to a PES packet controller 172 in the first ES buffer 170. The generated 13-bit write address from the write address generator 171 is supplied to the dual port RAM 174.

The PES packet controller 172 generates a header generation start signal in response to the write start signal from the write address generator 171 and outputs the generated header generation start signal to the first PES header generator 130 and a first multiplexer 140. The PES packet controller 172 also supplies a pay load start signal to a read address generator 173 in the first ES buffer 170, thereby causing the read address generator 173 to generate a 13-bit read address.

The dual port RAM 174 stores the 8-bit video stream data therein in response to the write address from the write address generator 171. The dual port RAM 174 also outputs the stored 8-bit video stream data in response to the read address from the read address generator 173. The read 8-bit video stream data from the dual port RAM 174 is transferred to the first multiplexer 140.

The ES packetizing unit further comprises a system time clock generator 10 for inputting the system clock signal of 27 MHz. The system time clock generator 10 samples the system clock signal of 27 MHz at a resolution of 90 KHz and outputs the resultant value (33 bits). In response to a clock signal I_CK from the video encoder indicating the start of an I picture of GOP, the sampled value from the system time clock generator 10 is latched into a D-flip flop 121 in a video time stamp generator 120.

The MPEG-2 system preferably performs the synchronization of the audio and video by controlling a presentation time and a decoding time using a presentation time stamp (PTS) and a decoding time stamp (DTS). In accordance with the preferred embodiment of the present invention, the time stamps are coded at a period of GOP. For example, if the GOP is comprised of 10 pictures, the time stamps are coded at an interval of 0.3 sec satisfying a range within 0.7 sec or a standard requirement.

The video time stamp generator 120 includes a first adder 122 for adding an offset to the latched value from the D-flip flop 121 under tile control of an operator, the offset corresponding to an interval between a coding start time point in the encoder and a time point that an actual time stamp is coded in the TS. As a result of the addition by the first adder 122, there is obtained a DTS providing a causal condition for the system.

The video time stamp generator 120 further includes a second adder 123 for adding a fixed signal value (9009) to the DTS from the first adder 122, the fixed signal value corresponding to an interval between I pictures. As a result of the addition by the second adder 123, a PTS is obtained. The DTS and PTS are coded by the video detect signal which is generated by the access unit detector 112 upon detecting a sequence header or a GOP start code from the video elementary stream from the video encoder in the unit of byte for a process of video elementary stream data. The DTS and PTS are 33-bit data satisfying an international standard requirement.

The PTS and DTS are main coding fields for a header. In response to the GOP detect signal from the ES controller 111, the first PES header generator 130 codes a 19-byte header in the case of including the PTS and DTS, whereas a 9-byte header in the case of including no PTS and DTS. As a result, the first PES header generator 130 generates a header in the unit of byte synchronously with a count from the PES packet controller 172.

The first multiplexer 140 multiplexes the header from the first PES header generator 130 and a pay load from the dual port RAM 174 and transmits the resultant signal to the TS through a video PES buffer 150.

The video PES buffer 150 is required to buffer a difference between a clock rate of the video encoder and a clock rate of a transport system. A full state of the video PES buffer 150 is checked, and the checked result may be used as a multiplexing scheduling control signal in the TS layer. Namely, the video PES buffer 150 generates a ready signal upon the presence of at least one TS pay load therein, thereby enabling the multiplexing in the TS.

Figure 3:
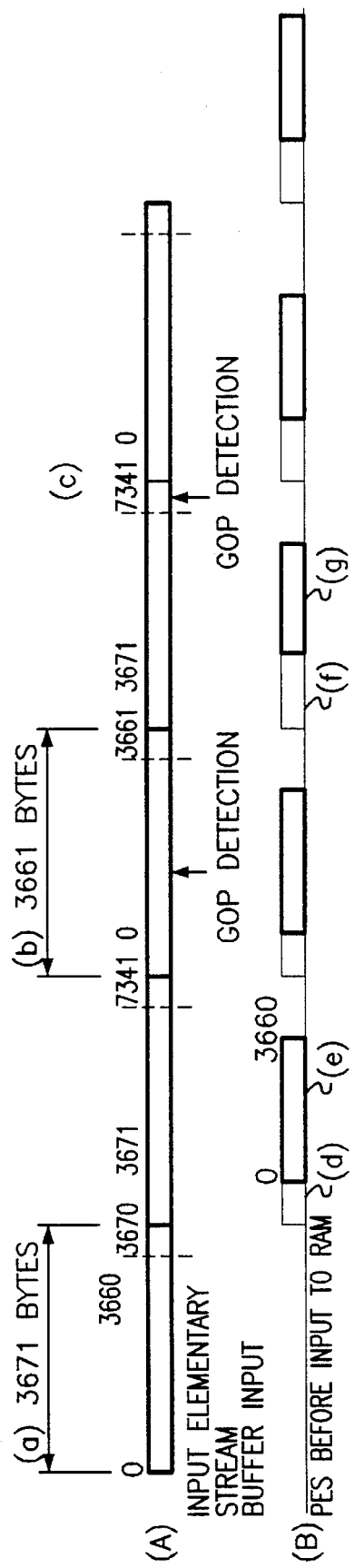
FIG. 3 shows timing diagrams of data in an elementary stream buffer in FIG. 2.

FIG. 3 shows timing diagrams of the data in the first ES buffer 170 in FIG. 2. The ES buffer is adapted to perform the buffering operation when the header is appended to the elementary stream to packetize it. In accordance with the preferred embodiment of the present invention, the PES packet has a size determined as 3680 bytes, which are obtained by taking an integer multiple of the TS pay load. Such a size of the PES packet facilitates the formation of the TS or the extraction of the PES from the TS. In the case where no optional field is used, a pay load of the PES ms 3671 bytes. In the case where the PTS and DTS optional fields are further used, the pay load of the PES is 3661 bytes.

Two RAMs may generally be used to implement the ES buffer, the RAMs having 3671-byte capacities. One of the two RAMs performs a read operation while the other performs a write operation. However, in accordance with the preferred embodiment of the present invention, a single dual port RAM is used to implement the ES buffer.

FIG. 3(A) is a timing diagram illustrating the read and write operations of the data in the first ES buffer 170 and FIG. 3(B) is a timing diagram illustrating the write operation of the pay load in the dual port RAM 174 based on the write address from the write address generator 171 in the case where no time stamp is coded because of the generation of no GOP signal. In these drawings, the reference numeral a designates the pay load, the reference numeral d designates the header for the pay load a and the reference numeral e designates the pay load a read in response to the read address from the read address generator 173. As a result, the reference numerals d and e indicate one PES packet. The reference numerals b, f and g designate the PES packet in the case where the time stamps are coded. The reference numeral c indicates the reflection of the time stamps on the PES header, following one PES, in the case where the GOP is generated subsequently to a minimum size of pay load.

Figure 4:
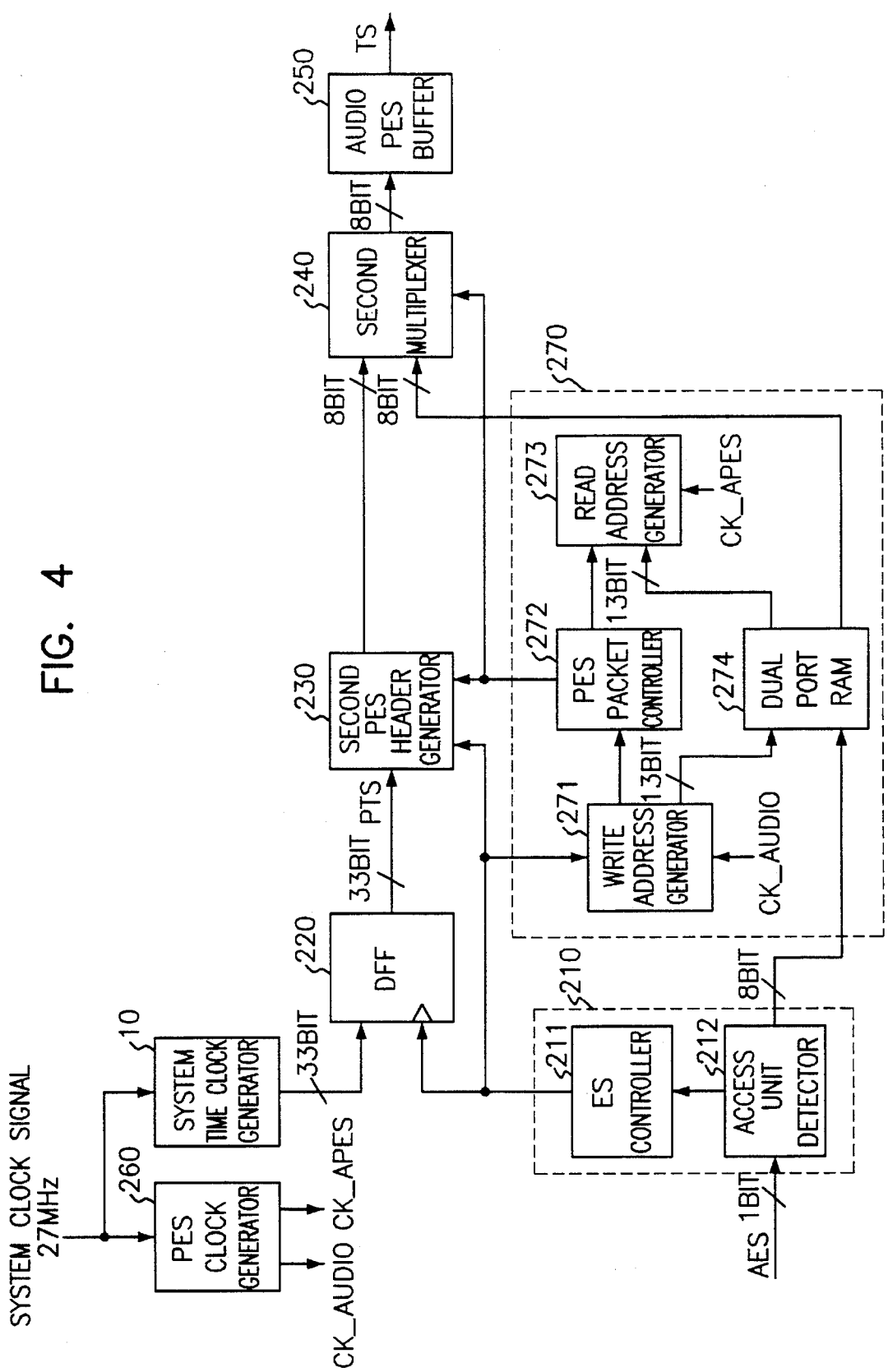
FIG. 4 is a detailed block diagram of an audio PES processing circuit in FIG. 1.

Referring to FIG. 4, there is shown a detailed block diagram of an audio PES processing circuit 200 in FIG. 1. The audio PES processing circuit 200 is substantially the same in construction and operation as the video PES processing circuit 100, with several differences as will hereinafter be described briefly.

As shown in FIG. 4, the audio PES processing circuit 200 includes an audio time stamp generator 220. The audio time stamp generator 220 includes a D-flip flop for latching the sampled value from the system time clock generator 10 in response to an audio frame synchronous word detection start signal from an audio stream interface circuit 210 to generate a PTS for a process of audio elementary stream data.

On the other hand, an audio access unit is equal to an audio frame and has a 1152-byte size. The detection of the audio access unit is performed by detecting a 12-bit frame synchronous word from an audio elementary stream AES. In order to prevent an emulation of the synchronous word, a locking function is required as shown in FIG. 5 in the case where the synchronous word is generated at least twice at a frame interval.

Figure 5:
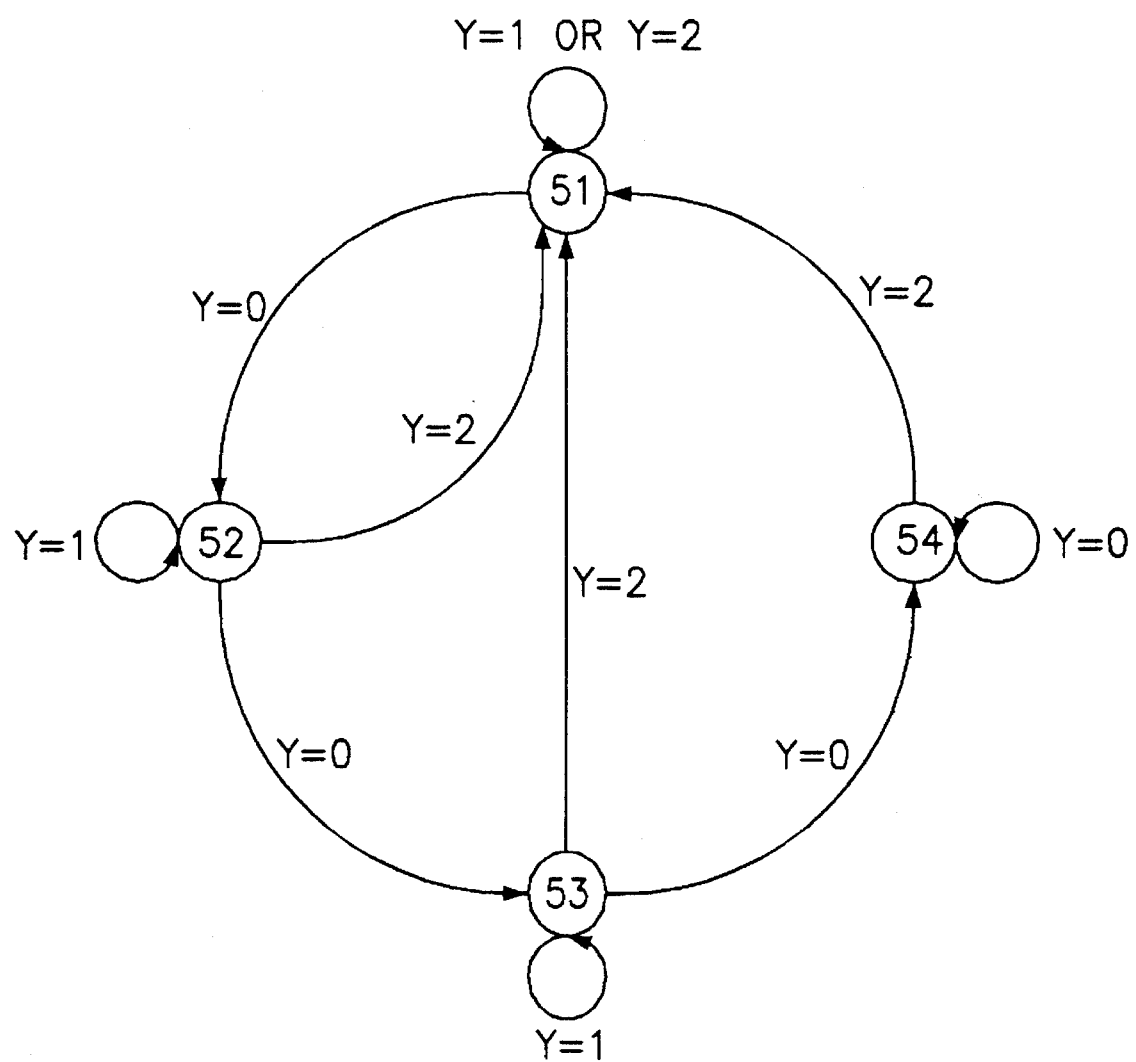
FIG. 5 is a view illustrating a state transition of an audio access unit detector in FIG. 4.

FIG. 5 is a view illustrating a state transition of an audio access unit detector 212 in FIG. 4. In this drawing, the reference numeral 51 designates an initial state and the reference numeral 54 designates a locked state resulting from the detection of the synchronous word at least three times. An expression of Y=0 means that the synchronous word is detected with respect to only one frame. The state 51 proceeds to a state 52 upon the detection of only the synchronous word. An expression of Y=1 means a state that no frame synchronous word is detected prior to the formation of one frame and an expression of Y=2 means other cases. Also, the audio access unit detector 212 performs a serial/parallel conversion operation by outputting the locked data in the unit of byte.

As apparent from the above description, according to the present invention, the elementary stream packetizing unit for the MPEG-2 system can receive the coded video and audio streams and packetize the received streams, respectively. The elementary stream packetizing unit of the present invention can meet the international standard requirement and be applied to a digital TV broadcasting field. Further, the elementary stream packetizing unit of the present invention can efficiently perform the synchronization of the video and audio in the decoder.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An elementary stream packetizing unit for an MPEG-2 system comprising:

system time clock generation means for inputting an external system clock signal and sampling the inputted system clock signal at a resolution of a predetermined frequency;

first time stamp generation means for latching a sampled value from said system time clock generation means in response to an external system clock signal indicating the start of an I picture, to generate a first presentation time stamp and a decoding time stamp for a process of video elementary stream data;

second time stamp generation means for latching the sampled value from said system time clock generation means in response to an audio frame synchronous word detection start signal to generate a second presentation time stamp for a process of audio elementary stream data;

first stream interface means for inputting a video elementary stream data from the outside of the elementary stream packetizing unit and generating a group-of-picture detect signal in response to the inputted video elementary stream data, said first stream interface means outputting the inputted video elementary stream data directly;

second stream interface means for inputting a audio elementary stream data from the outside of the elementary stream packetizing unit and generating the audio frame synchronous word detection start signal in response to the inputted audio elementary stream data, said second stream interface means outputting the inputted audio elementary stream data directly and transferring the audio frame synchronous word detection start signal to said second time stamp generation means;

first buffering means for storing temporarily the video elementary stream data from said first stream interface means and generating a first header generation start signal, in response to the group-of-picture detect signal from said first stream interface means;

second buffering means for storing temporarily the audio elementary stream data from said second stream interface means and generating a second header generating start signal, in response to the audio frame synchronous word detection start signal from said second stream interface means;

first header generation means for generating a first header in response to the first presentation time stamp and the decoding time stamp from said first time stamp generation means, the first header generation start signal from said first buffering means and the group-of-picture detect signal from said first stream interface means;

second header generation means for generating a second header in response to the second presentation time stamp from said second time stamp generation means, the second header generation start signal form said second buffering means and the audio frame synchronous word detection start signal from said second stream interface means;

first multiplexing means for multiplexing the first header from said first header generation means and the video elementary stream data from said first buffering means in response to the first header generation start signal form said first buffering means to generate a packetized video elementary stream; and second multiplexing means for multiplexing the second header from said second header generation means and the audio elementary stream data from said second buffering means in response to the second header generation start signal from said second buffering means to generate a packetized audio elementary stream.

2. An elementary stream packetizing unit for an MPEG-2 system as set forth in claim 1, wherein said first time stamp generation means includes:

first latch means for latching the sampled value from said system time clock generation means in response to the external clock signal indicating the start of the I picture;

first addition means for adding an offset to an output value from said first latch means under the control of an operator to generate the decoding time stamp and outputting the generated decoding time stamp to said first header generation means; and second addition means for adding a fixed signal value to the decoding time stamp from said first addition means to generate the first presentation time stamp and outputting the generated first presentation time stamp to said first header generation means, the fixed signal value corresponding to an interval between I pictures; and wherein said second time stamp generation means includes:

second latch means for latching the sampled value from said system time clock generation means in response to the audio frame synchronous word detection start signal from said second stream interface means to generate the second presentation time stamp and outputting the generated second presentation time stamp to said second header generation means.

3. An elementary steam packetizing unit for an MPEG-2 system as set forth in claim 1, wherein said first stream interface means includes:

first access unit detection means for inputting the video elementary stream data from the outside of the elementary stream packetizing unit and generating a video detect signal in response to the inputted video elementary stream data, said first access unit detection means outputting the inputted video elementary stream data directly to said first buffering means; and first elementary system control means for generating the group-of-picture detect signal in response to the video detect signal from said first access unit detection means and outputting the generated group-of-picture detect signal to said first buffering means and said first header generation means; and wherein said second stream interface means includes:

second access unit detection means for inputting the audio elementary stream data from the outside of the elementary stream packetizing unit and generating an audio detect signal in response to the inputted audio elementary stream data, said second access unit detection means outputting the inputted audio elementary stream data directly to said second buffering means; and second elementary stream control means for generating the audio frame synchronous word detection start signal in response to the audio detect signal from said second access unit detection means and outputting the generated audio frame synchronous word detection start signal to said second time stamp generation means, said second buffering means and said second header generation means.

4. An elementary stream packetizing unit for an MPEG-2 system as set forth in claim 1, wherein said first buffering means includes:

first write address generation means for generating a first write address and a first write start signal in response to the group-of-picture detect signal from said first stream interface means;

first storage means for storing the video elementary stream data from said first stream interface means in response to the first write address from said first write address generation means;

first packetized elementary stream packet control means for generating the first header generation start signal and a first pay load start signal in response to the first write start signal from said first write address generation means and outputting the generated first header generation start signal to said first header generation means and said first multiplexing means; and first read address generation means for generating a first read address in response to the first pay load start signal from said first packetized elementary stream packet control means and outputting the generated read address to said first storage means; and wherein said second buffering means includes:

second write address generation means for generating a second write address and a second write start signal in response to the audio frame synchronous word detection start signal from said second stream interface means;

second storage means for storing the audio elementary stream data from said second stream interface means in response to the second write address from said second write address generation means;

second packetized elementary stream packet control means for generating the second header generation start signal and a second pay load start signal in response to the second write start signal from said second write address generation means and outputting the generated second header generation start signal to said second header generation means and said second multiplexing means; and second read address generation means for generating a second read address in response to the second pay load start signal from said second packetized elementary stream packet control means and outputting the generated read address to said second storage means.

5. An elementary stream packetizing unit for an MPEG-2 system as set forth in claim 1, further comprising:

third and fourth buffering means connected respectively to said first and second multiplexing means for buffering a difference between a clock rate of a video encoder and a clock rate of a transport system.

\* \* \* \* \*